(12) United States Patent
Bock et al.

(10) Patent No.: US 7,848,424 B2
(45) Date of Patent: Dec. 7, 2010

(54) CONTROL OF FRAME TYPES IN VIDEO COMPRESSION

(75) Inventors: Alois Martin Bock, Eastleigh (GB); Richard May, Fordingbridge (GB)

(73) Assignee: Ericsson AB, Stockholm (SE)

( * ) Notice: Subject to any disclaimer, the term of this patent is extended or adjusted under 35 U.S.C. 154(b) by 1511 days.

(21) Appl. No.: 11/208,276

(22) Filed: Aug. 18, 2005

(65) Prior Publication Data

US 2006/0045183 A1 Mar. 2, 2006

(30) Foreign Application Priority Data

Aug. 27, 2004 (GB) .................................. 0419194.6

(51) Int. Cl.
*H04N 7/12* (2006.01)

(52) U.S. Cl. ............. 375/240.15; 375/240; 375/240.01; 375/240.12; 375/240.14

(58) Field of Classification Search .................. 375/240, 375/240.01, 240.12, 240.14, 240.15
See application file for complete search history.

(56) References Cited

U.S. PATENT DOCUMENTS

| 6,028,633 | A | * | 2/2000 | Saunders et al. ........ 375/240.01 |
| 6,040,861 | A | | 3/2000 | Boroczky et al. |
| 2001/0031003 | A1 | * | 10/2001 | Sawhney et al. ........ 375/240.14 |

\* cited by examiner

*Primary Examiner*—Allen Wong

(57) ABSTRACT

A method of controlling frame types in a video compression system having I, P and B frames calculates activity figures of the video signal in vertical, vertical temporal and horizontal directions. Video sequences with low complexity in which the vertical activity within a field is less than the vertical-temporal activity within a frame are encoded without using B frames whereas sequences with high complexity, i.e. spatial detail, are encoded using B frames by the use of the invention, disadvantages associated with B frames are reduced by the selected use of B frames.

4 Claims, 4 Drawing Sheets

CONTROL OF FRAME TYPES IN VIDEO COMPRESSION

BACKGROUND OF THE INVENTION

1. Field of the Invention

This invention relates to controlling the types of frame that are used in video compression.

2. Description of the Related Art

A known motion picture encoding system is that known as MPEG (Moving Pictures Expert Group) in which a GOP (Group of Pictures) structure is constructed by a plurality of pictures, each of which is in a data form. In the MPEG structure, an I picture, a P picture and a B picture are specified as picture coding types.

The I picture is an Intra-encoded Picture and is used to denote an intra-frame encoded image. The I picture represents the whole picture plane which is Intra-encoded and is encoded in accordance with the same order as that of the original image. The P picture is a Predictive-Picture and is a predicted encoded frame looking in an inter-frame forward direction, i.e. it is an image which is motion compensated predicted from a past image. In some circumstances the P picture includes an intra-encoded portion of a small block unit in the picture plane and it is encoded in accordance with the same order as that of the original image. A Bi-directionally Predictive-Picture (B) is a bi-directional predictive encoded message, i.e. it is an image which is motion compensation predicted from past and future images. The B picture may include the intra-encoded portion of the small block unit in the picture frame. In a GOP there is at least one I picture and in, for example, MPEG 1 it is specified that the beginning of the GOP is the I picture in a bit stream and the last of the GOP in the order of the original picture plane is an I or P picture.

The bi-directionally predicted B frames improve coding efficiency for a number of reasons:

(a) There are more coding modes to choose from in B frames because B frames can take predictions from past as well as future frames.
(b) It is possible to make predictions of uncovered areas from future frames in B frames.
(c) The possibility of combined predictions, i.e. taking the "average" of two predictions, one from a past and one from a future frame, helps with certain types of motion and with noisy images.

However, using B frames also introduces a number of disadvantages.

(i) In order to be able to predict from future frames, these future frames need to be predicted in the first instance. However, since these predictions have to be made across more frame periods, the frames are usually less correlated and predictions are less accurate. For the sake of clarity, in this disclosure each TV frame is composed of two, normally interlaced, TV fields.
(ii) An object moving at a certain speed might be within the search range if predictions are made from one frame to the next but it might be outside the search range if predictions need to be made two or more frames into the future.

FIG. 1 shows in schematic form how B frame predictions are made from both past and future frames. It also shows that the prediction of P frames has to be made across all B frames between an I or P and a P frame of concern. This rate of difference in time between I and P frames may break the search range of the motion estimation thus reducing picture quality. In practice, in dependence upon the compression algorithm, search range etc., the majority of picture material improves with B frames, but there is always a fraction of sequences which are better encoded without B frames. To avoid the disadvantages of B frames while making use of their advantages, where appropriate, would require adaptive switching between coding with B frames and coding without B frames.

FIG. 2 shows in schematic form an example of an adaptive coding sequence. In FIG. 2 the first part of the coding sequence uses B frames but in the second part B frames are not used. Sequences such as the one shown in FIG. 2 in which B frames are sometimes used and sometimes not used are available in some encoders such as non-real time encoders in which the two parts of the sequence are encoded separately. Therefore the process of adaptively switching B frames on and off is not, of itself, novel. The difficulty however is to decide when B frames should be used and when they should not be used. One arrangement envisaged by the present inventors is to encode two streams in parallel, one with B frames and one without. However, such an arrangement would be very costly for a real time encoder because the encoder would need twice the processing power.

Adaptive and selective coding of video digital signals is disclosed in U.S. Pat. Nos. 5,227,878 and 5,828,787.

SUMMARY OF THE INVENTION

The present invention seeks to provide a method and apparatus for controlling the frame types, particularly B types of frame, in video compression which at least partially mitigates the foregoing disadvantages.

According to this invention in its broadest aspect there is provided a method of controlling frame types in a video compression system having I, P and B frames including the steps of determining fast moving scenes with little spatial activity and distinguishing such scenes from slow moving scenes or scenes with high spatial detail, and in dependence upon the determination, fast moving scenes are encoded without B frames whereas the slow moving scenes or scenes with high spatial detail are encoded with B frames.

According to a first aspect of this invention there is provided a method of controlling frame types in a video compression system having I, P and B frames including the steps of:

determining from a video input signal an activity figure:
in a vertical direction within a field (1),
in a vertical-temporal direction within a frame (2),
determining an intra-field spatial activity figure in a horizontal direction along a TV line and in a vertical direction along lines in a field (3),
evaluating:
if (1) is less than (2)
and (3) is less than a predetermined threshold
then increase a counter by a count of one, otherwise reset the counter to zero,
if the count in the counter is greater than predetermined number N then do not use B frames, otherwise use B frames.

In a feature of this invention there is provided a method of controlling frame types in a video compression system having 1, P and B frames including the steps of:

providing samples a, b, c, d, e of an interlaced video signal where
sample a is undelayed,
sample b is delayed by one line,
sample c is delayed by one field plus one line,
sample d is delayed by one field plus two lines, sample e is delayed by one field plus one line plus a further delay along the line, applying the samples to differencing means to determine |b-a|, |c-a|, |c-b|, |c-e|, and |c-d|, accumulating the resultant output of the differencing means to provide (i) (|b-a|+|c-d|) over a field     (1)

(ii) (|c-a|+|c-b|) over a field     (2)

(iii) (|c-e|+|c-d|) over a field     (3)

evaluating:
if (1) is less than (2),
(3) is less than a predetermined threshold
then increase a counter by one, otherwise reset the counter to zero,
if the count in the counter is greater than a predetermined number N then do not use B frames, otherwise use B frames in a frame switch signal.

According to a second aspect of this invention there is provided an apparatus for controlling frame types in a video compression system having I, P and B frames including:

means for determining from a video input signal an activity figure:
  in a vertical direction within a field of view (1),
  in a vertical temporal direction within a frame (2),
means for determining an intra-field spatial activity figure in a horizontal direction along a TV line and in a vertical direction along the TV line in a field (3)
  means for evaluating:
  if (1) is less than (2)
  and (3) is less than a predetermined threshold,
then if the foregoing condition is satisfied, means for increasing the count of a counter by one, otherwise resetting the counter to zero,
and if the count in the counter is greater than a predetermined number then means for producing a switch signal to not use B frames, otherwise use B frames.

In a feature of this invention there is provided an apparatus for controlling frame types in a video compression system having I, P and B frames including:
providing samples a, b, c, d, e of an interlaced video signal where
  means for providing sample where a is undelayed,
  means for providing sample where b is delayed by one line,
  means for providing sample where c is delayed by one field plus one line,
  means for providing sample where d is delayed by one field plus two lines,
  means for providing sample where e is delayed by one field plus one line plus a further delay along the line,
  means for applying the samples to differencing means to determine |b-a|, |c-a|, |c-b|, |c-e|, and |c-d|,
  means for accumulating the resultant output of the differencing means to provide (i) (|b-a|+|c-d|) over a field     (1)

(ii) (|c-a|+|c-b|) over a field     (2)

(iii) (|c-e|+|c-d|) over a field     (3)

means for evaluating:
if (1) is less than (2),
(3) is less than a predetermined threshold
then increase a counter by one, otherwise reset the counter to zero, and means for evaluating if the count in the counter is greater than a predetermined number N then said evaluating means does not use B frames, otherwise use B frames in a frame switch signal.

BRIEF DESCRIPTION OF THE DRAWINGS

The invention will now be described by way of example with reference to the accompanying drawings in which.

DESCRIPTION OF THE PREFERRED EMBODIMENT

In this invention a decision is made whether or not B frames are to be used and the decision is derived from a set of parameters which are calculated by analysis of the input video signal. The invention is based on calculating a number of activity-figures of the video signal in vertical (i.e. within a field), vertical-temporal (within a frame over two TV fields) and a horizontal direction (along a line).

The inventors have found that video sequences in which the vertical activity within a field is less than the vertical-temporal activity within a frame are better coded without B frames. However such sequences with high complexity, i.e. spatial detail, still subjectively are better coded using B frames. Hence the intra-field spatial activity (vertical and horizontal) should also be lower than average to code without B frames. In all other cases B frames should be used.

The foregoing may simply be expressed by stating that fast moving scenes with little spatial detail should be encoded without using B frames whereas slow moving scenes or scenes with high spatial detail should be encoded with B frames.

Figure 1:
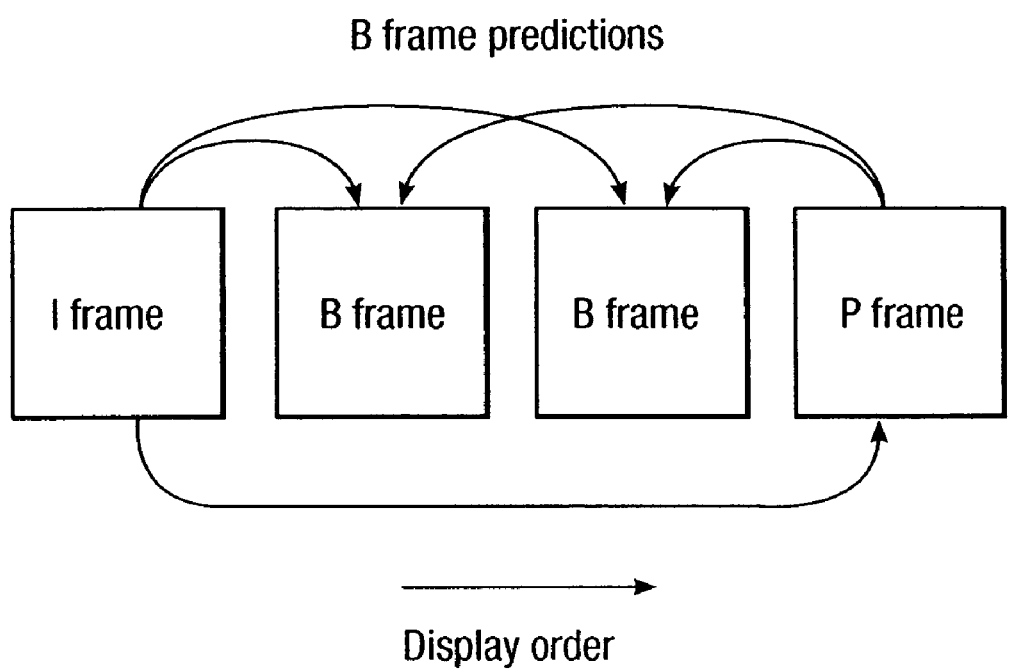
FIG. 1 shows in schematic form how B frames are predicted from both past and future frames.
Figure 2:
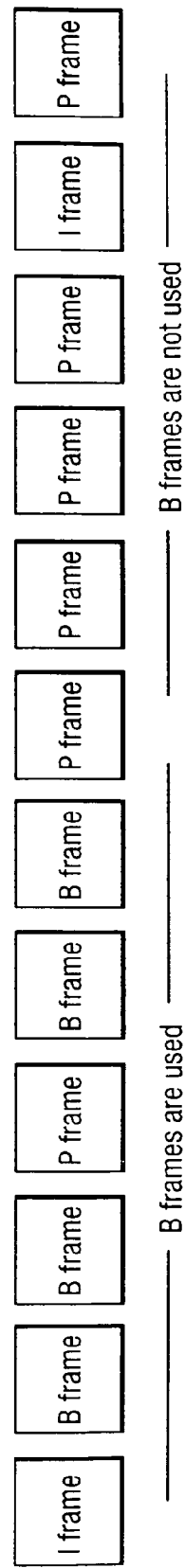
FIG. 2 shows in schematic form a coding sequence where B frames are used in a first part of a sequence but not in the second part.
Figure 3:
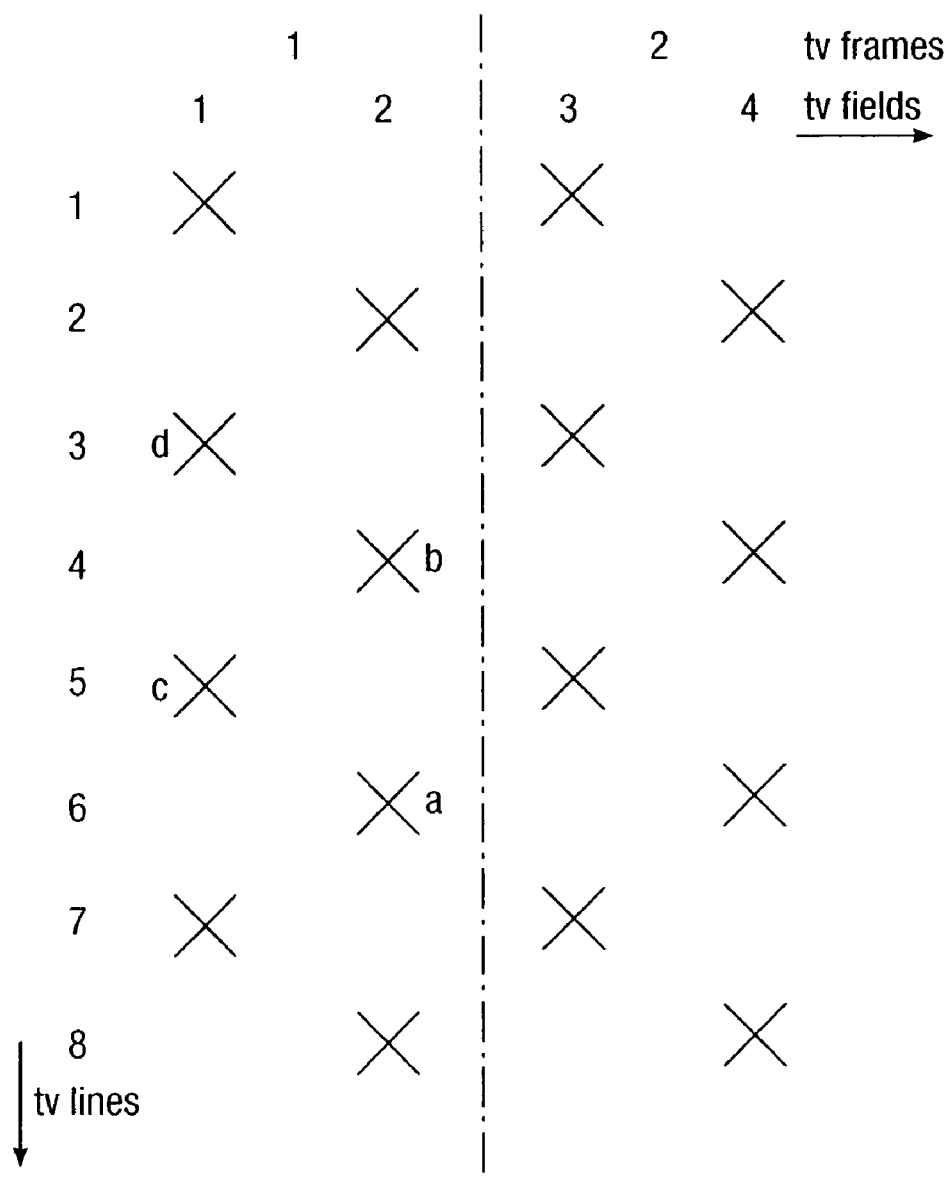
FIG. 3 shows a diagram of vertical-temporal sample positions of an interlaced video signal.
Figure 4:
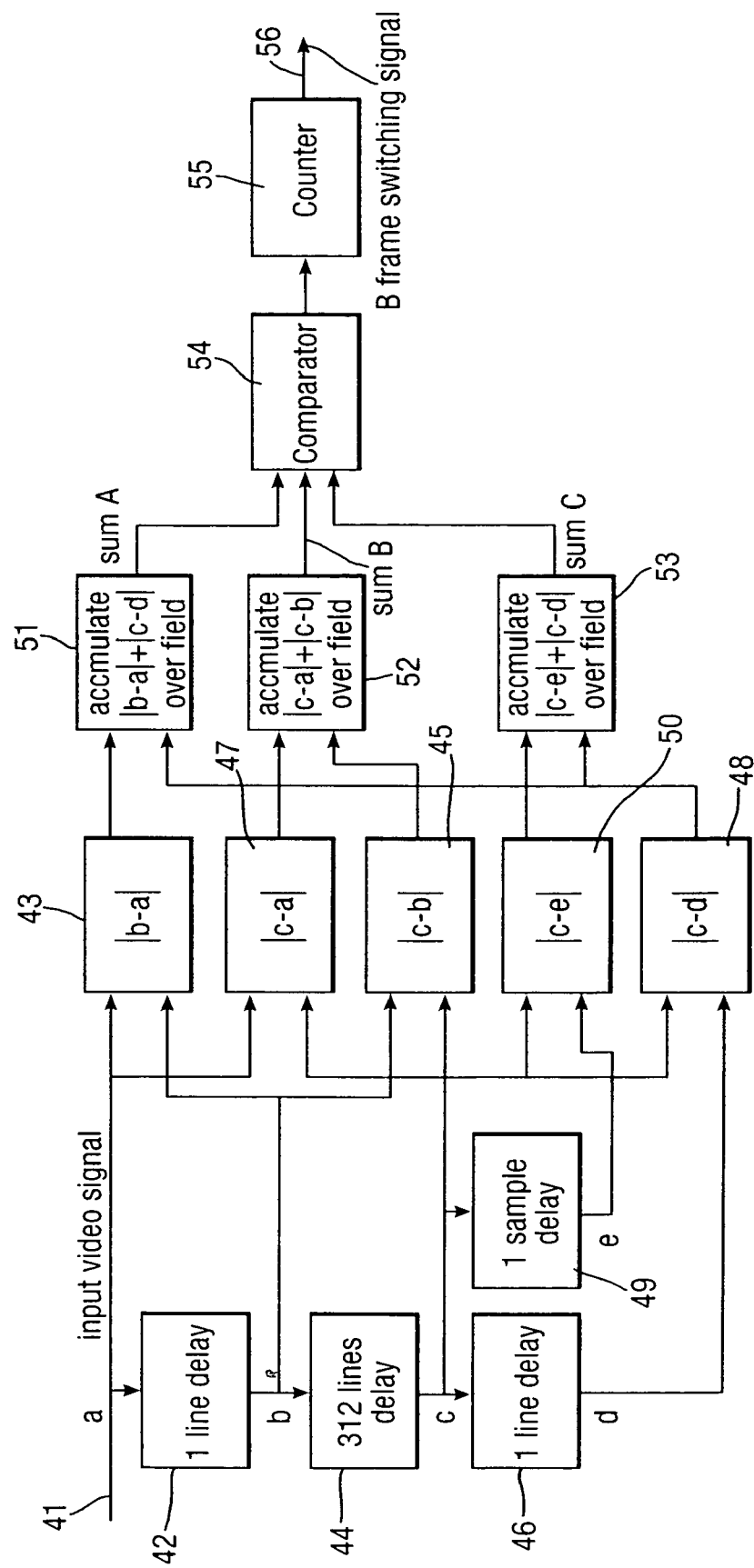
FIG. 4 shows a block diagram of an apparatus in accordance with this invention.

FIG. 3 shows a graphical representation of the spatio-temporal sampling pattern of an interlaced video signal. Video lines a and b represent adjacent lines within field 2 whereas video lines c and d are neighbouring lines within field 1. Video lines a and b are both vertical-temporally adjacent to video line c when considering the video frame 1. It is to be noted that video sample e is not shown in FIG. 3 but is on the same video line as sample c but spaced by one luminance clock cycle (adjacent sample on the same video line). An apparatus for performing the invention is shown in FIG. 4 in which video signal samples are applied on input line 41 such that sample a is applied to a one line delay 42 and to an absolute subtractor 43. An output of the delay 42 is denoted by sample b which is applied to a delay 44 which has a delay of one field plus one line, i.e. a 312 line delay for a 625 line standard or a 262 line delay for a 525 line standard, and to the absolute subtractor 43 and an absolute subtractor 45. An output of the delay 44 is denoted by sample c which is applied to a one line delay 46 and to the absolute subtractor 45 and further absolute subtractors 47 and 48. An output of delay 46 denoted by sample d is also applied as an input to absolute subtractor 48. The sample c is applied to a one sample delay 49, i.e. sample e is on the same video line as sample c but delayed by one luminance clock cycle. The sample e is applied to an absolute subtractor 50 which also receives as an input sample c. Output from absolute subtractors 43 and 48 is applied to an accumulator 51, the output from absolute subtractors 47 and 45 is applied to an accumulator 52, and output from absolute subtractors 48 and 50 is applied to an accumulator 53. The outputs of the accumulators 51, 52 and 53 are applied to a comparator 54, the output of the comparator being applied to a counter 55 which produces at output 56 the B frame switching signal. The arrangement of FIG. 4 accumulates the absolute value of sample differences |b-a|+|c-d|, |c-a|+|c-b| and |c-e|+|c-d| over one field period. By comparing the accumulated values after each frame period, the B frame switching signal is derived as follows:

If $$\Sigma_{field}(|b-a|+|c-d|) < \Sigma_{field}(|c-a|+|c-b|) \quad (1)$$

and $$\Sigma_{field}(|c-e|+|c-d|) < \text{threshold} \quad (2)$$

then increment counter by one.
Otherwise reset counter to zero.
If counter >N
then do not use B frames
otherwise use B frames.

The counter is used to prevent rapid switching between the two modes. With N=3, for example, a minimum of 4 frames have to indicate lower intra-field activity than intra-frame activity and low spatial activity before B frames are disabled. However, a single frame in which the intra-field activity is greater than the intra-frame activity or in which the spatial activity is greater than 'average' will enable B frames once again. The threshold for spatial activity is set to the median spatial activity value of a sufficiently large set of test sequences.

The following Table I shows an example of how B frames are switched on and off depending on accumulated activity numbers (figures) where N=3 and the threshold equals 5000.

TABLE 1

| Frame | $\Sigma_{field}$ (\|b − a\| + \|c − d\|) (1) | $\Sigma_{field}$ (\|c − a\| + \|c − b\|) (2) | $\Sigma_{field}$ (\|c − e\| + \|c − d\|) (3) | Criterion met | Counter | Use B frames |
|---|---|---|---|---|---|---|
| 0 | 474 | 117 | 3945 | (2) | 0 | Yes |
| 1 | 475 | 223 | 3961 | (2) | 0 | yes |
| 2 | 478 | 385 | 3897 | (2) | 0 | yes |
| 3 | 483 | 497 | 3983 | (1) and (2) | 1 | yes |
| 4 | 480 | 522 | 4276 | (1) and (2) | 2 | yes |
| 5 | 496 | 552 | 4109 | (1) and (2) | 3 | yes |
| 6 | 502 | 613 | 4224 | (1) and (2) | 4 | no |
| 7 | 556 | 634 | 4610 | (1) and (2) | 5 | no |
| 8 | 603 | 689 | 4837 | (1) and (2) | 6 | no |
| ... | | | | | | |
| 95 | 597 | 678 | 4809 | (1) and (2) | 93 | no |
| 96 | 625 | 730 | 5126 | (1) | 0 | yes |

It is to be understood that modifications could be made and that all such modifications falling within the spirit and scope of the appended claims are intended to be included in the present invention.

We claim:

1. A method of controlling frame types in a video compression system having Intra-encoded (I), Predictive (P) and Bi-directional (B) frames including the steps of:
   determining from a video input signal an activity figure:
   in a vertical direction within a field (1),
   in a vertical-temporal direction within a frame (2),
   determining an intra-field spatial activity figure in a horizontal direction along a TV line and in a vertical direction along lines in a field (3),
   evaluating:
   if (1) is less than (2)
   and (3) is less than a predetermined threshold then increase a counter by a count of one, otherwise reset the counter to zero, if the count in the counter is greater than predetermined number N then do not use B frames, otherwise use B frames.

2. A method of controlling frame types in a video compression system having Intra-encoded (I), Predictive (P) and Bi-directional (B) frames including the steps of:
   providing samples a, b, c, d, e of an interlaced video signal where
   sample a is undelayed,
   sample b is delayed by one line,
   sample c is delayed by one field plus one line,
   sample d is delayed by one field plus two lines,
   sample e is delayed by one field plus one line plus a further delay along the line,
   applying the samples to differencing means to determine |b-a|, |c-a|, |c-b|, |c-e|, and |c-d|,
   accumulating the resultant output of the differencing means to provide
   (i) (|b-a|+|c-d|) over a field (1)
   (ii) (|c-a|+|c-b|) over a field (2)
   (iii) (|c-e|+|c-d|) over a field (3)
   evaluating:
   if (1) is less than (2),
   (3) is less than a predetermined threshold
   then increase a counter by one, otherwise reset the counter to zero
   if the count in the counter is greater than a predetermined number N then do not use B frames, otherwise use B frames in a frame switch signal.

3. An apparatus for controlling frame types in a video compression system having Intra-encoded (I), Predictive (P) and Bi-directional (B) frames including:
   means for determining from a video input signal an activity figure:
   in a vertical direction within a field of view (1),
   in a vertical temporal direction within a frame (2),
   means for determining an intra-field spatial activity figure in a horizontal direction along a TV line and in a vertical direction along the TV line in a field (3)
   means for evaluating:

if (1) is less than (2)
and (3) is less than a predetermined threshold,
then if the foregoing condition is satisfied, means for increasing the count of a counter by one, otherwise resetting the counter to zero,
and if the count in the counter is greater-than a predetermined number then means for producing a switch signal to not use B frames, otherwise use B frames.

4. An apparatus for controlling frame types in a video compression system having Intra-encoded (I), Predictive (P) and Bi-directional (B) frames including:
   providing samples a, b, c, d, e of an interlaced video signal where
   means for providing sample where a is undelayed,
   means for providing sample where b is delayed by one line,
   means for providing sample where c is delayed by one field plus one line,
   means for providing sample where d is delayed by one field plus two lines,
   means for providing sample where e is delayed by one field plus one line plus a further delay along the line,
   means for applying the samples to differencing means to determine |b-a|, |c-a|, |c-b|, |c-e|, and |c-d|,
   means for accumulating the resultant output of the differencing means to provide
   (i) (|b-a|+|c-d|) over a field (1)
   (ii) (|c-a|+|c-b|) over a field (2)
   (iii) (|c-e|+|c-d|) over a field (3)
   means for evaluating:
   if (1) is less than (2),
   (3) is less than a predetermined threshold then increase a counter by one, otherwise reset the counter to zero, and means for evaluating if the count in the counter is greater than a predetermined number N then said evaluating means does not use B frames, otherwise use B frames in a frame switch signal.

* * * * *